US008934139B2

(12) United States Patent
Nakaya

(10) Patent No.: US 8,934,139 B2
(45) Date of Patent: Jan. 13, 2015

(54) LABEL CREATION SYSTEM, PRINT CONTROL APPARATUS, PRINT CONTROL METHOD AND COMPUTER PROGRAM PRODUCT

(71) Applicant: Seiko Epson Corporation, Tokyo (JP)

(72) Inventor: Eiji Nakaya, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/932,949

(22) Filed: Jul. 1, 2013

(65) Prior Publication Data

US 2014/0022568 A1 Jan. 23, 2014

(30) Foreign Application Priority Data

Jul. 20, 2012 (JP) ................................ 2012-161242

(51) Int. Cl.

| | |
|---|---|
| ***G06F 15/00*** | (2006.01) |
| ***G06K 1/00*** | (2006.01) |
| ***G06K 15/00*** | (2006.01) |
| ***B65C 9/46*** | (2006.01) |
| ***B65C 9/40*** | (2006.01) |
| ***B41J 3/407*** | (2006.01) |
| ***B41J 11/00*** | (2006.01) |

(52) U.S. Cl.

CPC ... *B65C 9/46* (2013.01); *B65C 9/40* (2013.01); *B41J 3/4075* (2013.01); *B41J 11/008* (2013.01)

USPC .......................... 358/1.9; 358/1.12; 358/1.18

(58) Field of Classification Search

None

See application file for complete search history.

(56) References Cited

U.S. PATENT DOCUMENTS

| | | | | |
|---|---|---|---|---|
| 5,881,214 | A * | 3/1999 | Morisawa et al. | 358/1.18 |
| 2002/0148655 | A1 | 10/2002 | Cho et al. | |
| 2005/0226670 | A1 * | 10/2005 | Akaiwa et al. | 400/615.2 |
| 2007/0131769 | A1 * | 6/2007 | Tanaka | 235/451 |
| 2008/0074453 | A1 * | 3/2008 | Furukawa | 347/14 |
| 2008/0232886 | A1 * | 9/2008 | Kato et al. | 400/76 |
| 2010/0040399 | A1 * | 2/2010 | Van Pottelberghe et al. | 400/76 |
| 2010/0253727 | A1 * | 10/2010 | Nishioka et al. | 347/14 |
| 2013/0215438 | A1 * | 8/2013 | Yoshida | 358/1.9 |

FOREIGN PATENT DOCUMENTS

| | | | |
|---|---|---|---|
| JP | 2001-519742 | A | 10/2001 |
| JP | 2003-29915 | A | 1/2003 |
| JP | 2010-234608 | A | 10/2010 |
| WO | WO-99-39912 | A | 8/1999 |

* cited by examiner

*Primary Examiner* — Ming Hon

(74) *Attorney, Agent, or Firm* — ALG Intellectual Property, LLC

(57) ABSTRACT

A label creation system includes: a tape printing unit which prints a reference mark as an indicator of unit length onto a tape and thus creates a reference label; an image pickup unit which picks up an image of the reference label arranged along a pasting surface forming a planned pasting area, together with the planned pasting area; an image processing unit having a dimension detection unit which compares the reference mark and the planned pasting area in a picked-up image and detects a length of the planned pasting area that is in a direction of length of the fixed-length label; and a label length setting unit which sets a label length of the fixed-length label based on the length of the planned pasting area that is detected; wherein the tape printing unit prints on the tape and creates the fixed-length label based on the label length that is set.

13 Claims, 12 Drawing Sheets

LABEL CREATION SYSTEM, PRINT CONTROL APPARATUS, PRINT CONTROL METHOD AND COMPUTER PROGRAM PRODUCT

CROSS-REFERENCE

The entire disclosure of Japanese Patent Application No. 2012-161242 filed on Jul. 20, 2012, which is hereby incorporated by reference in its entirety.

BACKGROUND

1. Technical Field

The present invention relates to a label creation system, a print control apparatus, a print control method and a computer program product for measuring dimensions of a planned pasting area for a label and creating a print label based on the measured dimensions.

2. Related Art

According to the related art, as a label creation system of this type, a character printing apparatus is known which includes: an acceleration sensor that measures a longitudinal size of a pasting target area, based on acceleration information and moving time measured when a character printing apparatus main body arranged at one end part in a longitudinal direction of the pasting target area is moved in the longitudinal direction from one end part of one lateral part of the pasting target area to the other end part; a laser range finder that measures a lateral size of the pasting target area as a laser beam emitted from the character printing apparatus main body moving on the one lateral part of the pasting target area is reflected by and returns from a reflection plate arranged on a boundary of the other lateral part in the longitudinal direction; a character print data generation unit that generates character print data to be printed in an optimum size on a character print tape, based on the measured longitudinal and lateral sizes of the pasting target area; and a character printing unit which prints the generated character print data on the character print tape (see JP-A-2010-234608).

However, in the character printing apparatus according to the related art, in the case where the dimension of the pasting target area is measured by the acceleration sensor, the character printing apparatus needs to be moved along one lateral part in the longitudinal direction of the pasting target area, but if there is a protrusion or the like on the lateral part of the pasting target area, the protrusion or the like obstructs the movement of the character printing apparatus. Therefore, the character printing apparatus cannot be moved properly and it is difficult to measure the dimension of the pasting target area. Similarly, in the case where the dimension of the pasting target area is measured by the laser range finder, if there is a protrusion or the like on the lateral part of the pasting target area, the reflection plate cannot be arranged properly and it is difficult to measure the dimension of the pasting target area.

SUMMARY

An advantage of some aspects of the invention is that a label creation system, a label creation method, a printing apparatus and a program which enable easy detection of dimensions of a planned pasting area and creation of a label suitable for the dimensions of the planned pasting area even in the case where there is a protrusion or the like around the planned pasting area, can be provided.

An aspect of the invention is directed to a label creation system including: a tape printing unit which prints a reference mark as an indicator of unit length onto a tape and thus creates a reference label; an image pickup unit which picks up an image of the reference label arranged along a pasting surface forming a planned pasting area where a fixed-length label having a predetermined label length is pasted, together with the planned pasting area; an image processing unit having a dimension detection unit which, by image processing, compares the reference mark printed on the reference label and the planned pasting area in a picked-up image and detects a length dimension of the planned pasting area that is in a direction of length of the fixed-length label; and a label length setting unit which sets a label length of the fixed-length label based on the length dimension of the planned pasting area that is detected. The tape printing unit prints on the tape and creates the fixed-length label, based on the label length of the fixed-length label that is set.

Another aspect of the invention is directed to a label creation method including: causing a tape printing unit to print a reference mark as an indicator of unit length onto a tape and thus create a reference label; acquiring a picked-up image from an image pickup unit which picks up an image of the reference label arranged along a pasting surface forming a planned pasting area where a fixed-length label having a predetermined label length is pasted, together with the planned pasting area; comparing the reference mark printed on the reference label and the planned pasting area in the picked-up image and detecting a length dimension of the planned pasting area that is in a direction of length of the fixed-length label by image processing; setting a label length of the fixed-length label based on the length dimension of the planned pasting area that is detected; and causing the tape printing unit to print on the tape and create the fixed-length label, based on the label length of the fixed-length label that is set.

Still another aspect of the invention is directed to a printing apparatus including: a reference image data storage unit which stores image data of a reference mark as an indicator of unit length; a tape printing unit which prints the reference mark on a tape based on the image data of the reference mark that is stored and thus creates a reference label; and a label length information acquisition unit which acquires label length information, wherein a print control apparatus picks up an image of the reference label arranged along a pasting surface forming a planned pasting area where a fixed-length label having a predetermined label length is pasted, together with the planned pasting area, then compares the reference mark and the planned pasting area in a picked-up image and detects a length dimension of the planned pasting area that is in a direction of length of the fixed-length label by image processing, and sets a label length of the fixed-length label based on the length dimension of the planned pasting area that is detected, and the label length information indicates the label length of the fixed-length label. The tape printing unit prints on the tape and creates the fixed-length label, based on the label length information that is acquired.

According to these configurations, since the dimension of the planned pasting area in the picked-up image is detected by image processing, even if there is a protrusion or the like around the planned pasting area, the protrusion or the like does not cause an obstruction and the length dimension of the planned pasting area can be detected easily. The label length of the fixed-length label is set based on the detected length dimension of the planned pasting area, and the fixed-length label having the label length suitable for the length dimension of the planned pasting area can be created based on the label length that is set. Also, since the reference label as an indicator of unit length can be created, the reference label need not be prepared in advance.

Yet another aspect of the invention is directed to a label creation system including a print control apparatus and a printing apparatus. The print control apparatus includes: an image pickup unit which picks up an image of a reference label arranged along a pasting surface forming a planned pasting area where a fixed-length label having a predetermined label length is pasted, the reference label being formed by printing on a tape a reference mark which includes tape width information indicating a tape width of the tape as a print target of the printing apparatus and which serves as an indicator of unit length, the image pickup unit picking up the image of the reference label together with the planned pasting area; an image processing unit having a dimension detection unit which, by image processing, compares the reference mark printed on the reference label and the planned pasting area in a picked-up image and detects a length dimension of the planned pasting area that is in a direction of length of the fixed-length label and a width dimension of the planned pasting area that is in a direction of width of the fixed-length label; a tape width acquisition unit which acquires the tape width from the tape width information included in the reference mark in the picked-up image; a label length setting unit which sets a label length of the fixed-length label based on the length dimension of the planned pasting area that is detected; and a division image creation unit which, if the tape width that is acquired is smaller than the width dimension of the planned pasting area that is detected, divides image data of a print image on the fixed-length label to create plural data based on the tape width and the width dimension of the planned pasting area. The printing apparatus includes: a tape width detection unit which detects the tape width of the tape as a print target; and a tape printing unit which prints the reference mark including the tape width information on the tape and thus creates the reference label, based on the tape width that is detected, and which prints on the tape to create the fixed-length label in plural number, based on the label length of the fixed-length label that is set and the image data of the print image that is divided.

According to this configuration, similarly to the above, the dimension of the planned pasting area in the picked-up image is detected by image processing. Therefore, even if there is a protrusion or the like around the planned pasting area, the protrusion or the like does not become an obstruction and the length dimension of the planned pasting area can be detected easily. The label length of the fixed-length label is set based on the detected length dimension of the planned pasting area, and the fixed-length label having the label length suitable for the length dimension of the planned pasting area can be created based on the label length that is set. Also, since the reference label as an indicator of unit length can be created, the reference label need not be prepared in advance.

Moreover, the printing apparatus detects the tape width of the tape as a print target and prints the tape width information indicating the detected tape width to create the reference label, whereas the print control apparatus picks up an image of the reference label to acquire the tape width, and divides image data of a print image to create plural data based on the tape width and the width dimension of the planned pasting area if the acquired tape width is smaller than the detected width dimension of the planned pasting area. Thus, plural fixed-length labels on which the print image is divided into plural images in the direction of width and thus printed are created. Therefore, even if the planned pasting area is broader in width than the tape width, the print image suitable for the width dimension of the planned pasting area can be shown in the planned pasting area by providing the plural fixed-length labels parallel to each other in the direction of width and pasting these fixed-length labels in the planned pasting area.

Still yet another aspect of the invention is directed to a label creation system including a print control apparatus and a printing apparatus. The print control apparatus includes: an image pickup unit which picks up an image of a reference label arranged along a pasting surface forming a planned pasting area where a fixed-length label having a predetermined label length is pasted, the reference label being formed by printing a reference mark as an indicator of unit length onto a tape, the image pickup unit picking up the image of the reference label together with the planned pasting area; an image processing unit having a dimension detection unit which, by image processing, compares the reference mark printed on the reference label and the planned pasting area in a picked-up image and detects a length dimension of the planned pasting area that is in a direction of length of the fixed-length label and a width dimension of the planned pasting area that is in a direction of width of the fixed-length label, and a tape width detection unit which, by image processing, compares the reference mark in the picked-up image and the tape having the reference mark printed thereon and detects a tape width of the tape; a label length setting unit which sets a label length of the fixed-length label based on the length dimension of the planned pasting area that is detected; and a division image creation unit which, if the tape width that is detected is smaller than the width dimension of the planned pasting area that is detected, divides image data of a print image on the fixed-length label to create plural data based on the tape width and the width dimension of the planned pasting area. The printing apparatus includes a tape printing unit which prints the reference mark on the tape and thus creates the reference label and which prints on the tape to create the fixed-length label in plural number, based on the label length of the fixed-length label that is set and the image data of the print image that is divided.

According to this configuration, similarly to the above, the dimension of the planned pasting area in the picked-up image is detected by image processing. Therefore, even if there is a protrusion or the like around the planned pasting area, the protrusion or the like does not become an obstruction and the length dimension of the planned pasting area can be detected easily. The label length of the fixed-length label is set based on the detected length dimension of the planned pasting area, and the fixed-length label having the label length suitable for the length dimension of the planned pasting area can be created based on the label length that is set. Also, since the reference label as an indicator of unit length can be created, the reference label need not be prepared in advance.

Moreover, the printing apparatus creates the reference label, whereas the print control apparatus detects the tape width by image processing based on the picked-up image of the reference label, and divides image data of a print image to create plural data based on the tape width and the width dimension of the planned pasting area if the detected tape width is smaller than the detected width dimension of the planned pasting area. Thus, plural fixed-length labels on which the print image is divided into plural images in the direction of width and thus printed are created. Therefore, even if the planned pasting area is broader in width than the tape width, the print image suitable for the width dimension of the planned pasting area can be shown in the planned pasting area by providing the plural fixed-length labels parallel to each other in the direction of width and pasting these fixed-length labels in the planned pasting area.

In this case, it is preferable that the image processing unit further includes a distortion correction unit which corrects distortion of the planned pasting area in the picked-up image by image processing, based on distortion of the reference mark in the picked-up image.

According to this configuration, in some cases, distortion occurs in the planned pasting area in the picked-up image because the image pickup angle to the planned pasting area is slanted or for some other reasons. In such a case, according to this configuration, since distortion in the picked-up image also occurs in the reference mark on the reference label arranged along the pasting surface, the distortion correction unit can correct the distortion of the planned pasting area in the picked-up image based on the distortion of the reference mark in the picked-up image. Therefore, the dimension of the planned pasting area can be detected highly accurately. Also, since distortion correction is carried out based on the distortion of the reference mark in the picked-up image, the user need not carry out an operation on the screen and the like for distortion correction. In this case, it is preferable that the reference mark is rectangular in order to be able to carry out distortion correction easily and properly.

In this case, it is preferable that the distortion correction unit corrects curved surface distortion of the planned pasting area in the picked-up image, based on curved surface distortion of the reference mark in the picked-up image due to the pasting surface which is a curved surface.

According to this configuration, if the planned pasting area in the picked-up image is a curved surface, the dimension of the planned pasting area can be detected highly accurately by correcting curved surface distortion of the planned pasting area, based on curved surface distortion of the reference mark in the picked-up image. Also, since curved surface distortion correction is carried out based on the curved surface distortion of the reference mark in the picked-up image, the user need not carry out an operation on the screen and the like for curved surface distortion correction.

In this case, it is preferable to further include: a contrast ratio detection unit which detects a planned area contrast ratio that is a contrast ratio between a planned area image printed in the planned pasting area as apart of a printed matter and a background in the picked-up image, and also detects a reference contrast ratio that is a contrast ratio between the reference mark printed on the reference label and the tape; and a contrast adjustment unit which creates the image data of the print image in such a way that a contrast ratio between the print image in the fixed-length label and the tape coincides with the planned area contrast ratio, based on a difference between the planned area contrast ratio and the reference contrast ratio.

According to this configuration, since the image data of the print image is created in such a way that the contrast ratio between the print image on the fixed-length label and the tape coincides with the planned area contrast ratio, the fixed-length label having the same contrast ratio as the planned area contrast ratio can be created. Even after the created fixed-length label is pasted in the planned pasting area on the printed matter, the printed matter can have an overall appearance that does not look awkward.

Further another aspect of the invention is directed to a program causing a computer to execute each process of the label creation method.

According to this configuration, by causing the computer to execute the program, even if there is a protrusion or the like around the planned pasting area, the length dimension of the planned pasting area can be measured easily and a label having a label length suitable for the length dimension of the planned pasting area can be created.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a first embodiment of a label creation system, a label creation method, a printing apparatus and a program according to the invention will be described with reference to the accompanying drawings. A label creation system according to this embodiment is to create a fixed-length label having a predetermined length and to create a reference label that is used to detect a dimension of a planned pasting area where the fixed-length label is pasted. This embodiment is described on the assumption that the label creation system creates a fixed-length label as a label for correcting a misprint (printing error or typing error) portion as a planned pasting area on a print sheet having sentences and the like printed thereon.

Figure 1:
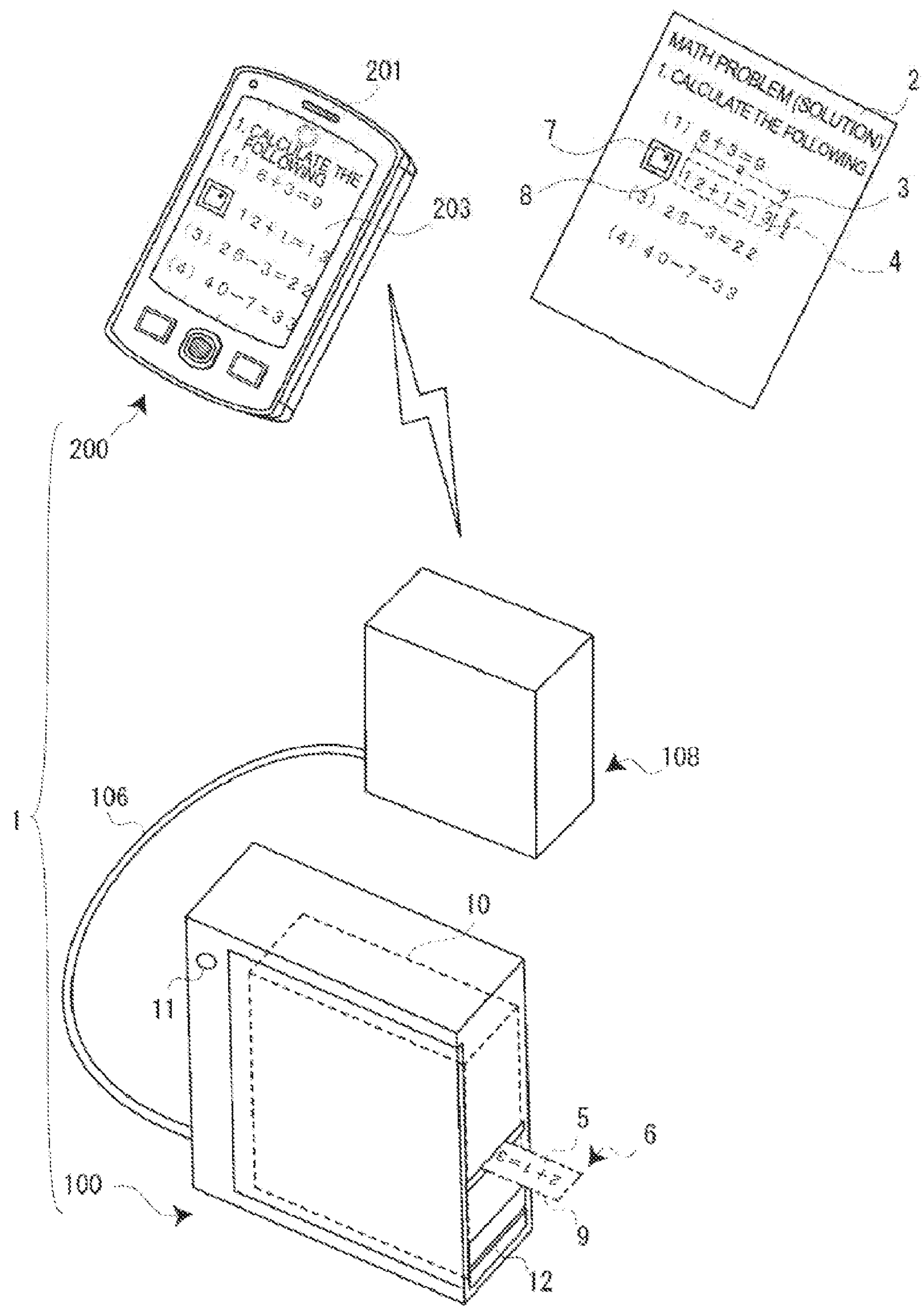
FIG. 1 shows the system configuration of a label creation system according to a first embodiment of the invention.

As shown in FIG. 1, for example, there is a misprint "12+1=13" (planned area image 3) while "2+1=3" should be printed on a print sheet 2. This misprint portion is defined as a planned pasting area 4, and a label creation system 1 creates a fixed-length label 6 on which a print image 5 "2+1=3" to correct the misprint is printed and which has a label length suitable for a planned pasting area longitudinal dimension 'a'. The dimension of the planned pasting area 4 in the direction of length of the fixed-length label 6 is referred to as the planned pasting area longitudinal dimension 'a', and the dimension in the direction of the width of the fixed-length label 6 is referred to as a planned pasting area width dimension 'b'.

The label creation system 1 first creates a reference label 8 on which a rectangular reference mark 7 as a indicator of unit length (for example, 1 cm) is printed, in order to detect the planned pasting area longitudinal dimension 'a'. The reference mark 7, more specifically, includes a square with each side having a unit length, and a dot provided in a one corner part of the square. The label creation system 1 creates the fixed-length label 6 based on the planned pasting area longitudinal dimension 'a' that is detected.

The label creation system 1 includes a tape printer 100, and a portable terminal 200 connected in such a way that the portable terminal 200 can communicate with the tape printer 100 via a wireless LAN (local area network) router 108. Of these units, the portable terminal 200 and the wireless LAN router 108 are connected wirelessly, and the wireless LAN router 108 and the tape printer 100 are wire-connected by a LAN cable 106. As a matter of course, the tape printer 100 and the portable terminal 200 may be enabled to communicate by another connection method. For example, the wireless LAN router 108 and the tape printer 100 may be connected wirelessly. Alternatively, the tape printer 100 and the portable terminal 200 may be connected wirelessly in ad hoc mode without using the wireless LAN router 108.

In the tape printer 100, a tape cartridge 10 housing a long strip-like tape 9 in such a way as to be able to reel off the tape 9 is installed. The tape printer 100 carries out print processing and cutting processing while reeling off the tape 9, and thus creates a label. The tape printer 100 carries out this print processing based on image data received from the portable terminal 200 via the wireless LAN router 108.

The tape printer 100 has a fixed-length print mode to create the fixed-length label 6 based on the planned pasting area longitudinal dimension 'a' detected by the portable terminal 200, and an optional-length print mode to create a label with an optional length, so that the user can select either mode.

The tape printer 100 has a reference label creation button 11 to create the reference label 8. When the reference label creation button 11 is pressed by the user, the tape printer 100 reads out image data of the reference mark 7 stored in advance in an apparatus-side control unit 105 (described later) and carries out print processing and cutting processing based on the image data, thus creating the reference label 8. Of course, the tape printer 100 may be configured to create the reference label 8 based on a command from the portable terminal 200, or may be configured to receive the image data of the reference mark 7 from the portable terminal 200.

Moreover, the tape printer 100 prints characters such as letters using a dot matrix (for example, 16×16). By increasing or decreasing the number of dots printed, the tape printer 100 can adjust the contrast ratio of the print image 5 to the tape 9. That is, by thinning dots printed, light letter and the like can be printed.

The tape 9 housed in the tape cartridge 10 has a so-called separation paper. The fixed-length label 6 and the reference label 8 after the separation paper is separated can be pasted in the planned pasting area 4 or the like without having to apply glue or the like again to the back side. As tape cartridge 10, plural types with different tape widths are prepared. In a case of the tape cartridge 10, plural holes to specify the tape width are provided. The tape printer 100 has a trimming unit 12 so that the created fixed-length label 6 and reference label 8 can be trimmed (by rounding four corners) according to need.

The portable terminal 200 is a general smartphone having an image pickup camera 201, a touch panel 203 and the like. In the portable terminal 200, an application program dedicated to the tape printer 100 (hereinafter referred to as a "dedicated application") is downloaded via a carrier network 218 (see FIG. 2) and installed. This dedicated application causes the portable terminal 200 to function so that the portable terminal 200 can measure the planned pasting area longitudinal dimension 'a' easily, and also to function so that the portable terminal 200 can cause the tape printer 100 to create the fixed-length label 6 having a label length suitable for the planned pasting area longitudinal dimension 'a'.

Figure 2:
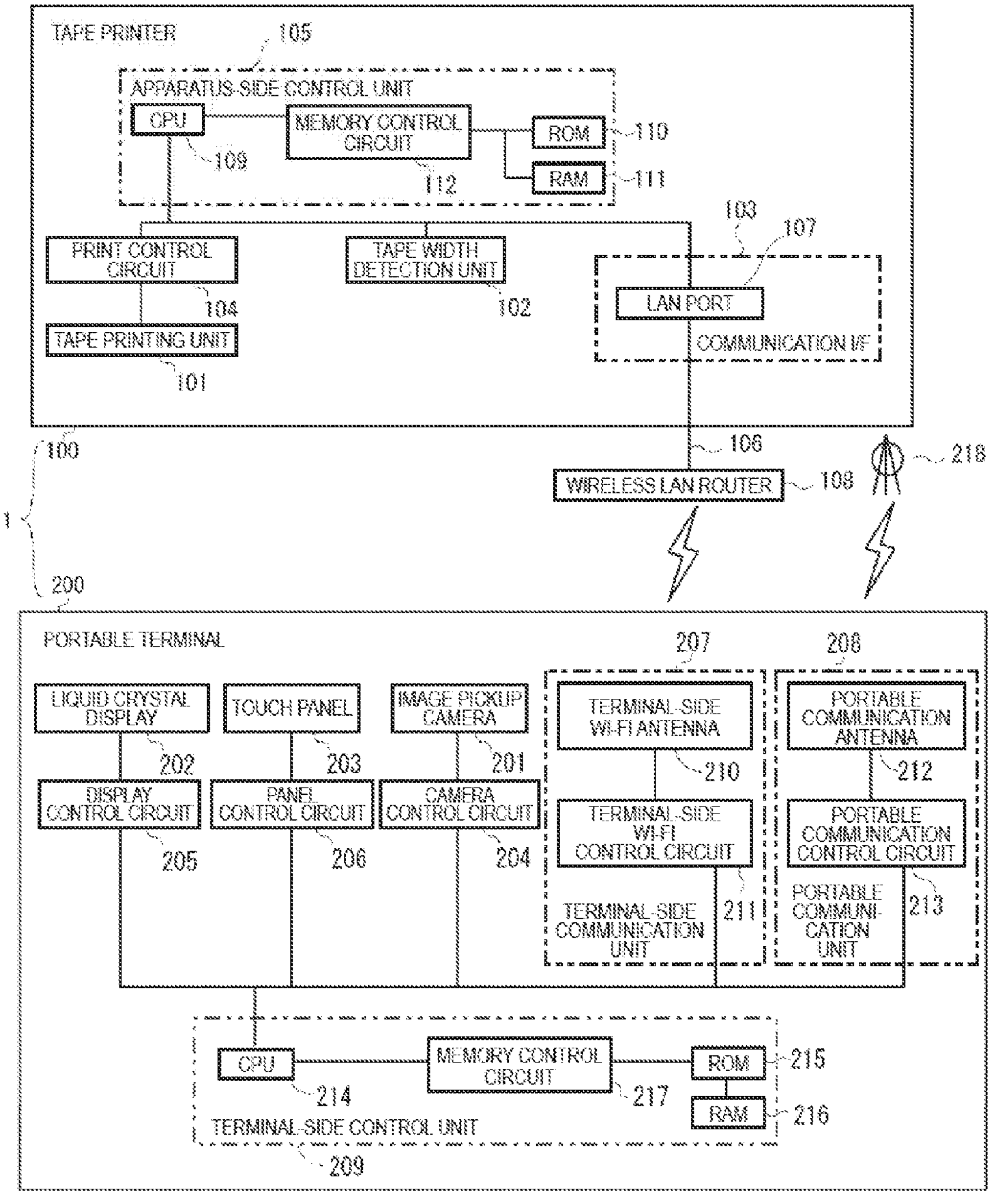
FIG. 2 is a block diagram showing the label creation system according to the first embodiment of the invention.
Figure 3:
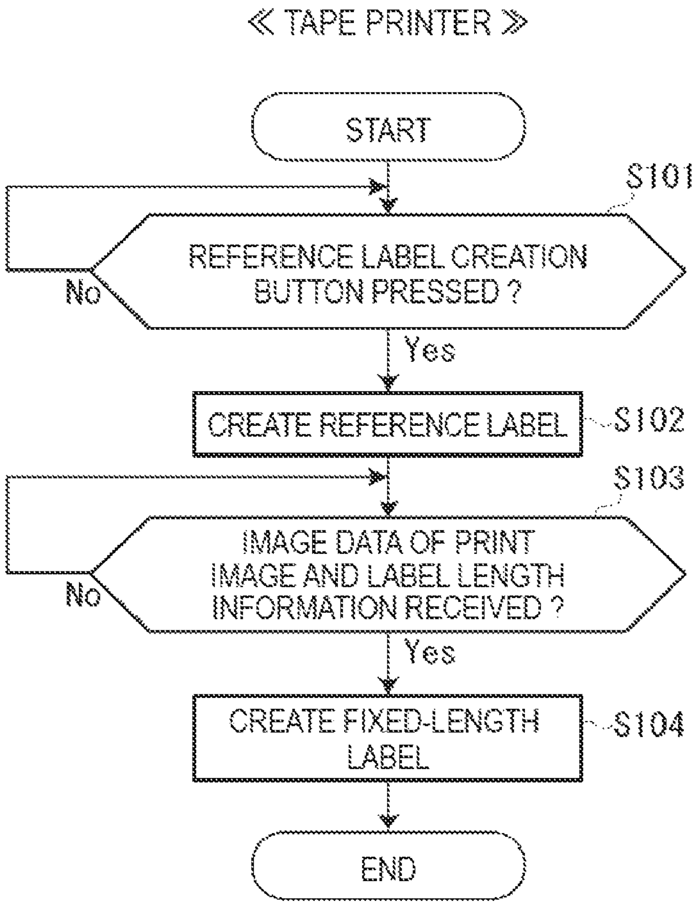
FIG. 3 is a flowchart showing the operation of a tape printer in the label creation system according to the first embodiment of the invention.
Figure 4:
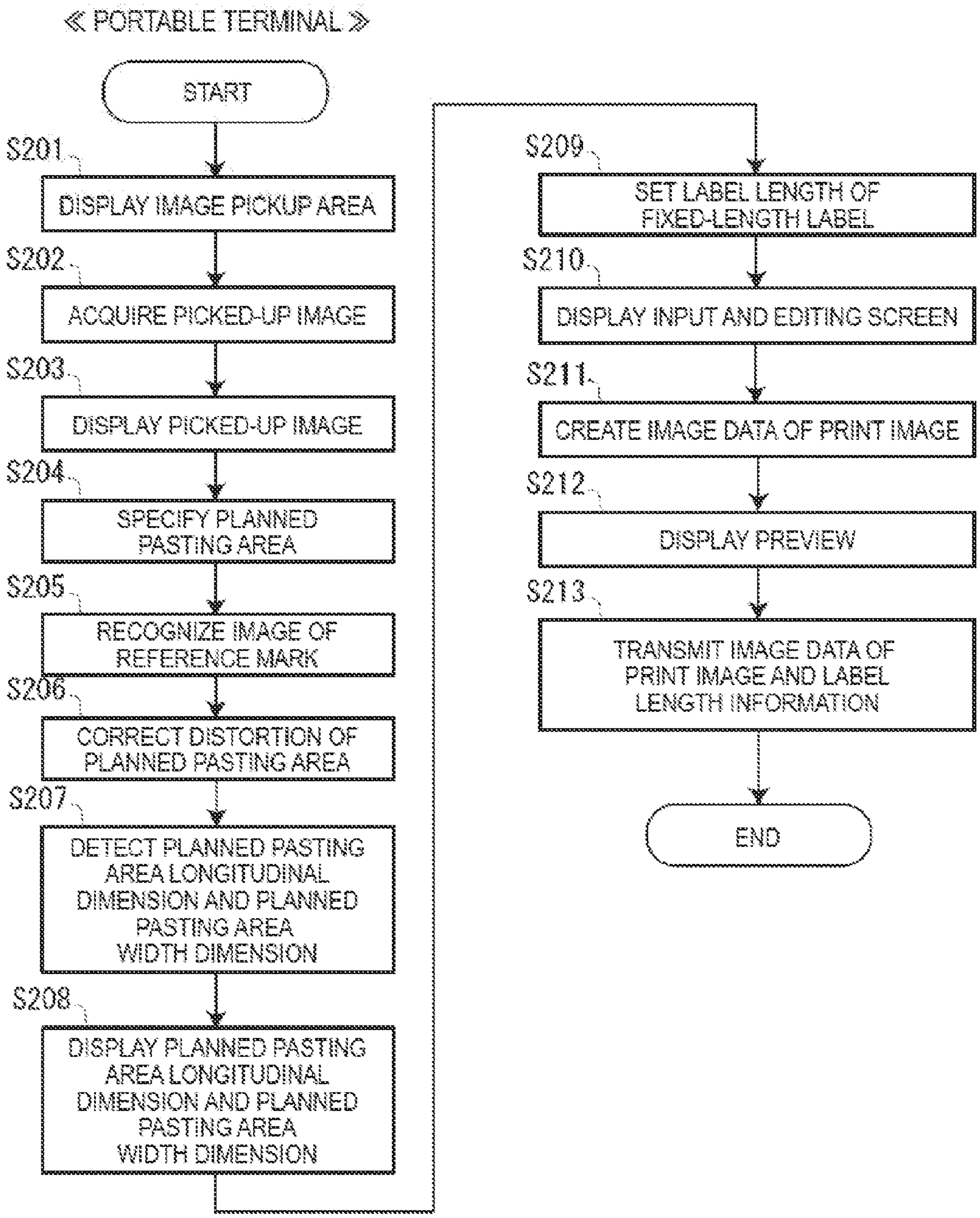
FIG. 4 is a flowchart showing the operation of a portable terminal in the label creation system according to the first embodiment of the invention.

As shown in FIG. 2, the tape printer 100 includes a tape printing unit 101, a tape width detection unit 102, a communication interface (communication I/F) 103, a print control circuit 104, and the apparatus-side control unit 105.

The tape printing unit 101 includes a feed roller which feeds the tape 9 while reeling off the tape 9 from the tape cartridge 10, a thermal head which thermally transfers and thus prints ink on an ink ribbon to the tape 9 that is fed, abutter which cuts and separates a printed portion of the tape 9, the above trimming unit 12 and the like. The tape width detection unit 102 includes a micro switch which detects the presence or absence of the plural holes (bit pattern) formed in the case of the tape cartridge 10, and thereby detects the tape width of the tape 9 housed in the tape cartridge 10. The communication interface 103 has a LAN port 107 in which the LAN cable 106 is inserted, and controls communication with the wireless LAN router 108.

The apparatus-side control unit 105 includes a CPU 109 (central processing unit), a ROM 110 (read only memory), RAM 111 (random access memory), and a memory control circuit 112. The CPU 109 processes various data in the RAM 111 according to a control program stored in the ROM 110, outputs various control signals to each part of the tape printer 100 and thus centrally controls the entire tape printer 100. In the ROM 110, image data of a reference image printed on the reference label 8 is stored.

The portable terminal 200 includes the image pickup camera 201, a liquid crystal display 202, the touch panel 203, a camera control circuit 204, a display control circuit 205, a panel control circuit 206, a terminal-side communication unit 207, a portable communication unit 208, and a terminal-side control unit 209.

The image pickup camera 201 includes a camera made up of an image sensor such as a CMOS (complementary metal oxide semiconductor) or CCD (charge coupled device) and can pick up (shoot) a still image or dynamic image. The liquid crystal display 202 displays various kinds of information to the user. For example, the liquid crystal display 202 displays a picked-up image that is picked up by the image pickup camera 201 and displays an input and editing screen for inputting and editing characters that form the print image 5 printed on the fixed-length label 6. The touch panel 203 is a pointing device to designate an arbitrary position within a screen of the liquid crystal display 202.

The camera control circuit 204 controls image pickup processing by the image pickup camera 201, based on a control signal from the terminal-side control unit 209, and outputs an image signal acquired by the image pickup camera 201 to the terminal-side control unit 209. The display control circuit 205 controls the display on the liquid crystal display 202, based on a control signal from the terminal-side control unit 209. The panel control circuit 206, when a finger or the like touches the touch panel 203, specifies the touched position and outputs coordinate data of the position to the terminal-side control unit 209.

The terminal-side communication unit 207 is for carrying out wireless communication with the wireless LAN router 108 and includes a terminal-side Wi-Fi antenna 210 which transmits and receives radio waves for wireless communication, and a terminal-side Wi-Fi control circuit 211 including a modulator, an amplifier and the like. While Wi-Fi is used as a wireless LAN communication standard in this embodiment, other wireless LAN communication standards may also be used and other communication systems such as Bluetooth (trademark registered) can be used. The portable communication unit 208 is for carrying out wireless communication with the carrier network 218 and includes a portable communication antenna 212 which transmits and receives radio waves for wireless communication, and a portable communication control circuit 213 including a modulator, an amplifier and the like.

The terminal-side control unit 209 includes a CPU 214, a ROM 215, a RAM 216, and a memory control circuit 217. The CPU 214 processes various data in the RAM 216 according to a control program stored in the ROM 215 and the above dedicated application and outputs various control signals to each part of the portable terminal 200, thus centrally controlling the entire portable terminal 200. As the terminal-side control unit 209 executes a program included in this dedicated application, various operations in label creation processing, described later, such as image processing of a picked-up image picked up by the image pickup camera 201 and creation of image data of the print image 5, can be realized in the portable terminal 200.

Next, a series of operations of label creation processing in the label creation system 1 will be described, mainly referring to FIGS. 3 to 6G and also referring to FIGS. 1 and 2. First, if the reference label creation button 11 is pressed by the user (S101; Yes), the tape printer 100 prints image data of the reference mark 7 on the tape 9 and thus creates the reference label 8 (S102).

Then, in the tape printer 100, if image data of the print image 5 and label length information (described later) are received from the portable terminal 200 via the wireless LAN router 108 (S103; Yes), the tape printing unit 101 prints the print image 5 on the tape 9 based on the received image data and cuts the tape 9 based on the received label length information, thus creating the fixed-length label 6 (S104).

Figure 5A:
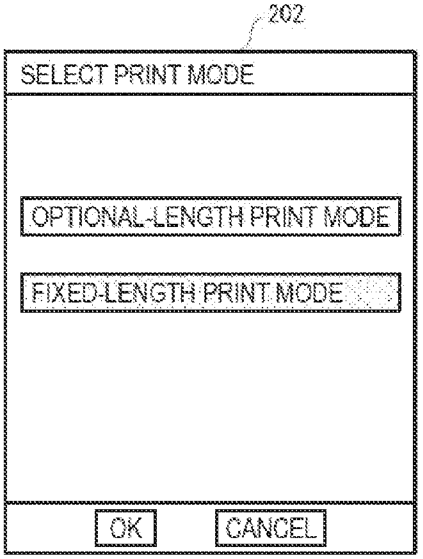
FIGS. 5A to 5D show screen transitions on the portable terminal.
Figure 5B:
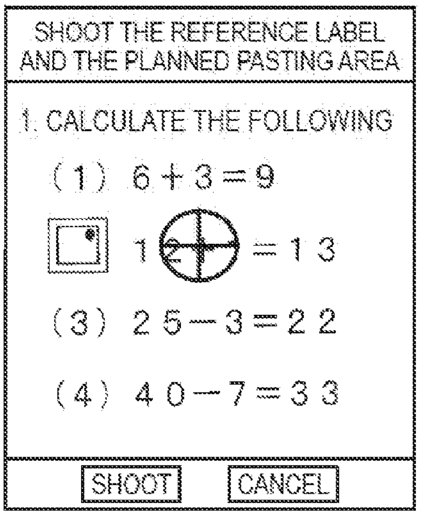

Meanwhile, in the portable terminal 200, as the dedicated application is started up based on the user's operation, a print mode selection screen is displayed on the liquid crystal display 202, as shown in FIG. 5A. If the user selects the fixed-length print mode, the portable terminal 200 displays an image pickup area to be picked up by the image pickup camera 201, on the liquid crystal display 202, and also displays "Shoot the reference label and the planned pasting area", as shown in FIG. 5B (S201). The user places the reference label 8 along the pasting surface (here, the surface of the print sheet 2) forming the planned pasting area 4 (or separates the separation paper and pastes the reference label 8 there), and then picks up an image of the reference label 8 and the planned pasting area 4 with the image pickup camera 201. Thus, the portable terminal 200 acquires a picked-up image of the reference label 8 and the planned pasting area 4 (S202).

Figure 5C:
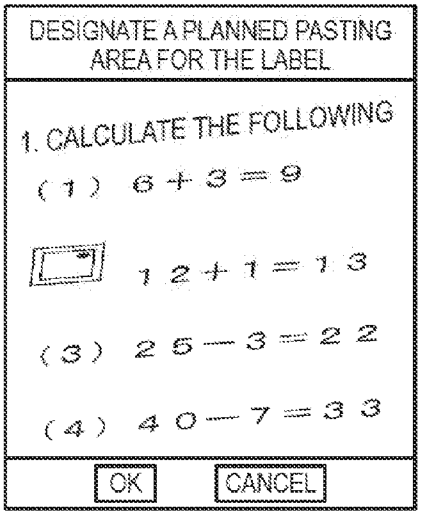
Figure 5D:
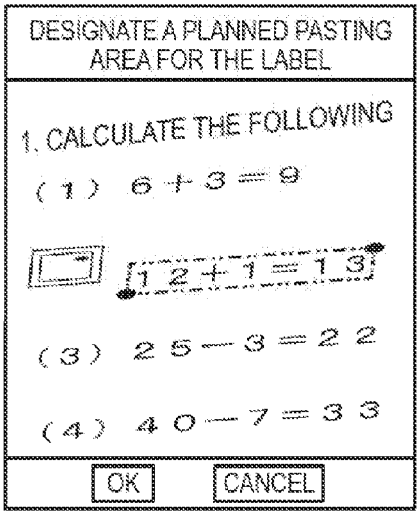

Next, the portable terminal 200 displays the acquired picked-up image on the liquid crystal display 202 and also displays "Designate a planned pasting area for the label", as shown in FIG. 5C (S203). In the portable terminal 200, if two points in the picked-up image displayed on the liquid crystal display 202 are pointed on the touch panel 203 by the user, the terminal-side control unit 209 acquires coordinate data of the two points that are pointed, and specifies the rectangular area having these two points at opposite angles, as the planned pasting area 4 in the picked-up image (S204). The portable terminal 200 displays the specified planned pasting area 4 on the liquid crystal display 202, as shown in FIG. 5D.

Next, in the portable terminal 200, the terminal-side control unit 209 recognizes the image of the reference mark 7 printed on the reference label 8 in the picked-up image (S205). Then, the terminal-side control unit 209 carries out distortion correction of the planned pasting area 4 by image processing (S206). That is, the distortion of the planned pasting area 4 in the picked-up image is corrected based on the distortion of the square reference mark 7 in the picked-up image. Thus, even if the planned pasting area 4 in the picked-up image is distorted because of the slant image pickup angle to the planned pasting area 4 or the like (see FIG. 5D), the distortion of the planned pasting area 4 in the picked-up image can be corrected. Therefore, the planned pasting area longitudinal dimension 'a' and the planned pasting area width dimension 'b' can be detected highly accurately. Also, since the distortion correction is carried out based on the distortion of the reference mark 7 in the picked-up image, the user need not carry out an operation and the like on the touch panel 203 for distortion correction.

Figure 6E:
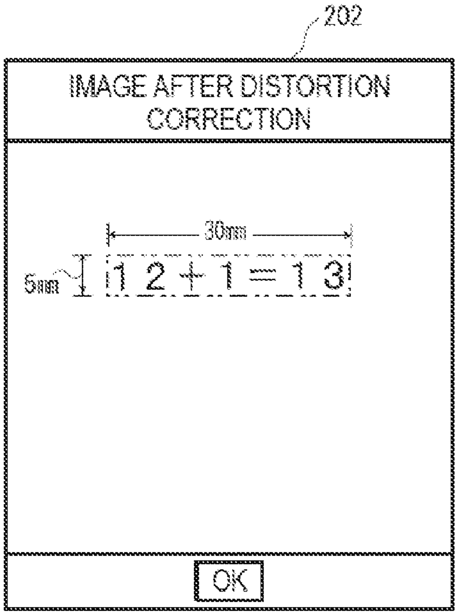
FIGS. 6E to 6G show screen transitions on the portable terminal, following FIGS. 5A to 5D.

Next, in the portable terminal 200, the terminal-side control unit 209 compares the reference mark 7 and the planned pasting area 4 in the picked-up image and detects the planned pasting area longitudinal dimension 'a' and the planned pasting area width dimension 'b' by image processing (S207). Also, the portable terminal 200 displays the detected planned pasting area longitudinal dimension 'a' and planned pasting area width dimension 'b' on the liquid crystal display 202, as shown in FIG. 6E (S208). Here, it is possible to detect the planned pasting area longitudinal dimension 'a' only. However, by detecting and displaying the planned pasting area width dimension 'b' as well, the user can be prompted to replace the tape cartridge 10 installed in the tape printer 100 with a tape cartridge 10 having a proper tape width. Moreover, the terminal-side control unit 209 sets a label length of the fixed-length label 6 based on the detected planned pasting area longitudinal dimension 'a' (S209). The label length may be set to be the same as the detected planned pasting area longitudinal dimension 'a' or may be set to be slightly longer or shorter than the planned pasting area longitudinal dimension 'a'.

Figure 6F:
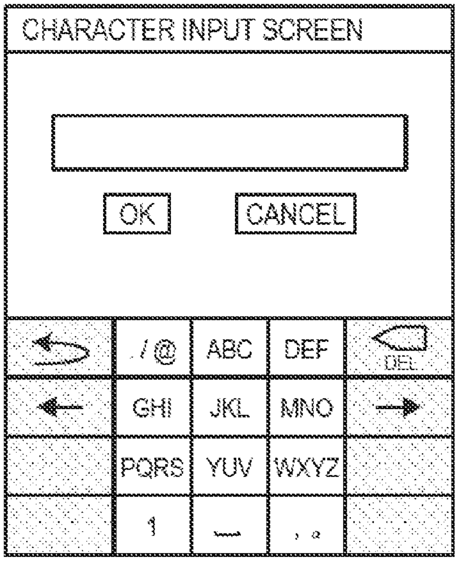
Figure 6G:
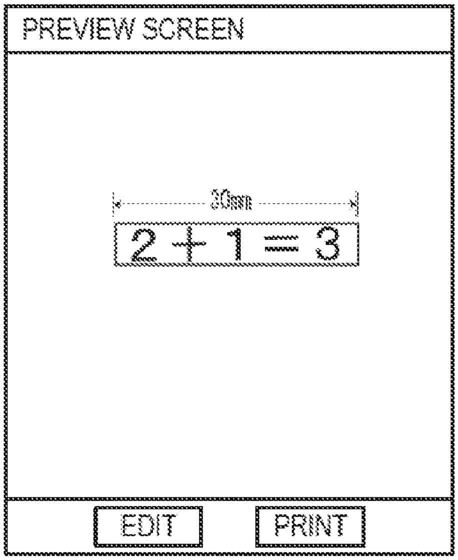

Next, in the portable terminal 200, if "OK" is pointed by the user, the display shifts to a screen shown in FIG. 6F. As shown in FIG. 6F, the portable terminal 200 displays an input and editing screen for inputting and editing characters that form the print image 5 printed on the fixed-length label 6, on the liquid crystal display 202 (S210). If "2+1=3" to correct the misprint "12+1=13" is inputted by the user, the terminal-side control unit 209 creates image data of the print image 5 based on the input information (S211). At this point, the user may be allowed to select a layout of the print image 5 from forward alignment, centering, rear alignment, and full justification. If "OK" is pointed by the user in the input and editing screen, the portable terminal 200 carries out preview display (S212). As shown in FIG. 6G, in this preview display, an overall picture of the print image 5 is shown as a preview and the label length of the fixed-length label 6 is displayed.

If "Print" is pointed by the user in the preview display screen, the portable terminal 200 transmits the created image data of the print image 5 and the label length information indicating the label length that is set, to the tape printer 100 via the wireless LAN router 108 (S213). Thus, the tape printer 100 prints the print image 5 on the tape 9 based on the image data and cuts the tape 9 based on the label length information, thus creating the fixed-length label 6, as described above.

As described above, according to the label creation system 1 of this embodiment, since the planned pasting area longitudinal dimension 'a' in the picked-up image is detected by image processing, even if there is a protrusion or the like around the planned pasting area 4, the protrusion or the like does not become an obstruction and the planned pasting area longitudinal dimension 'a' can be detected easily. Since the label length of the fixed-length label 6 is set based on the detected planned pasting area longitudinal dimension 'a', and the fixed-length label 6 is created based on the label length that is set, the fixed-length label 6 having the label length suitable for the planned pasting area longitudinal dimension 'a' can be created. Also, since the reference label 8 as an indicator of unit length can be created by the tape printer 100, the reference label 8 need not be prepared in advance. Moreover, by using the fixed-length label 6, thus created, for correcting a misprint on the print sheet 2, consumption of paper resources due to correction of the misprint and reprinting of the corrected document is reduced, thus leading to reduction in environmental load.

Figure 7:
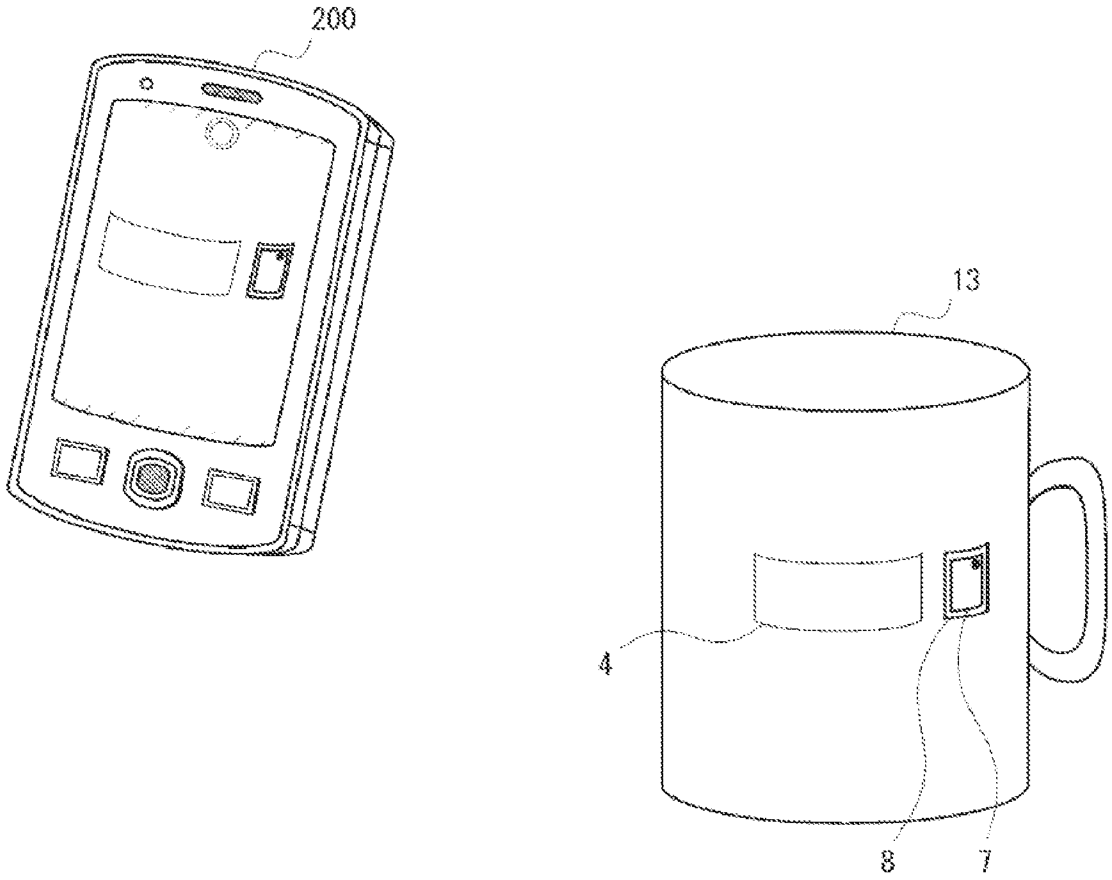
FIG. 7 shows a case where a planned pasting area on a fixed-length label is a curved surface.

In this embodiment, the terminal-side control unit 209 of the portable terminal 200 may be configured to carry out curved surface distortion correction of the planned pasting area 4 by image processing. Specifically, in the case where the fixed-length label 6 is to be created, using a shallow groove formed on the outer circumferential surface of a mug 13 of a cylindrical shape with a bottom as the planned pasting area 4, as shown in FIG. 7, the user pasts the reference label 8 along the outer circumferential surface of the planned pasting area 4 on the mug 13 and then picks up an image of both the planned pasting area 4 and the reference label 8. Thus, the portable terminal 200 acquires a picked-up image of the planned pasting area 4 and the reference label 8. The portable terminal 200 recognizes an image of the reference mark 7 printed on the reference label 8 pasted on the outer circumferential surface of the mug 13 in the picked-up image, and also corrects the curved surface distortion of the planned pasting area 4 in the picked-up image, based on the curved surface distortion of the reference mark 7 in the picked-up image. By thus correcting the curved surface distortion of the planned pasting area 4, the planned pasting area longitudinal dimension 'a' and the planned pasting area width dimension 'b' can be detected highly accurately. Also, since the curved surface distortion correction is carried out based on the curved surface distortion of the reference mark 7 in the picked-up image, the user need not carry out an operation and the like on the touch panel 203 for curved surface distortion correction.

Figure 8:
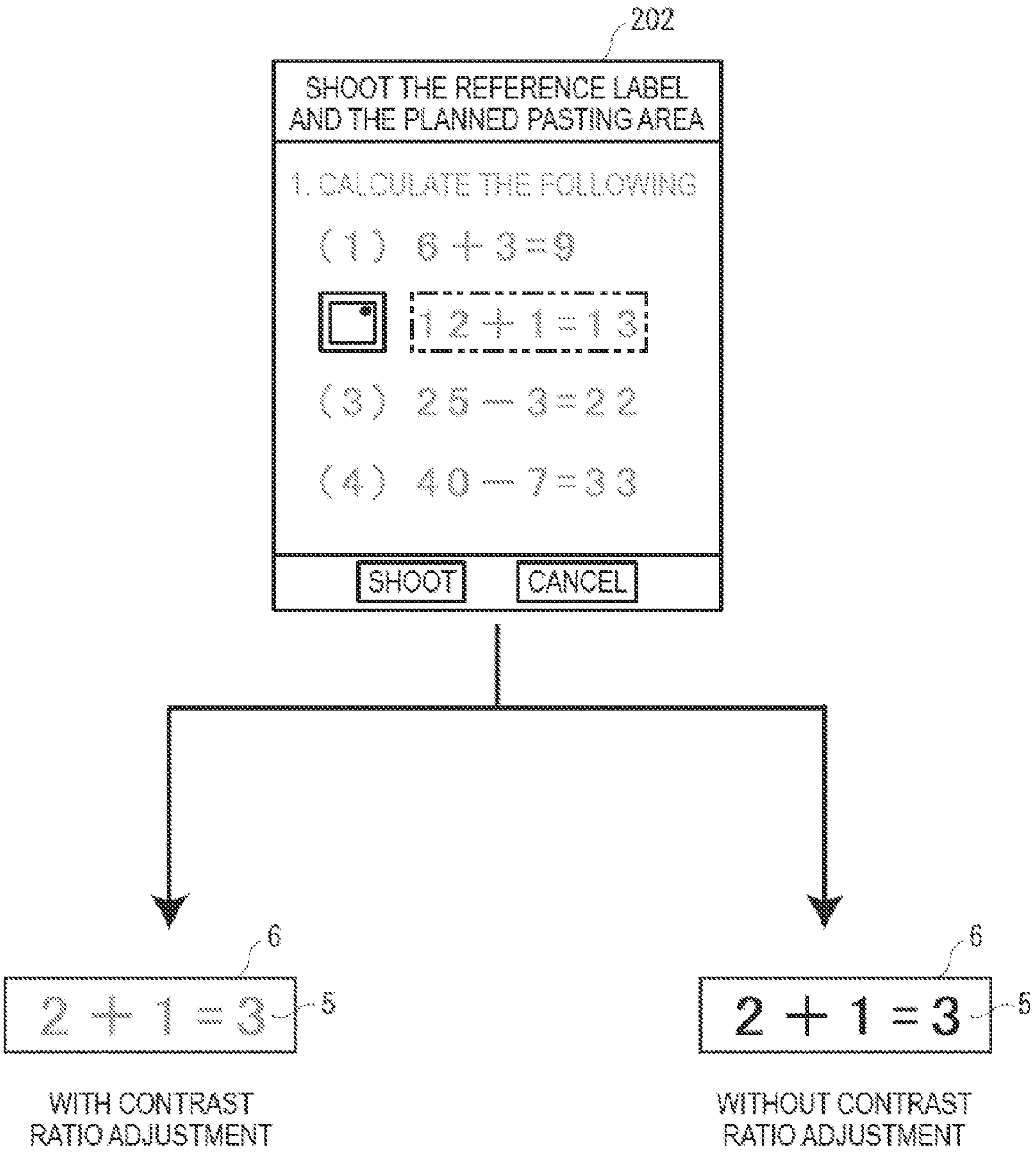
FIG. 8 shows an example of adjustment of a contrast ratio between a print image on the fixed-length label and a tape.

In this embodiment, the contrast ratio between the print image 5 on the fixed-length label 6 and the tape 9 can be adjusted based on the reference label 8, as shown in FIG. 8. In this case, the terminal-side control unit 209 detects a planned area contrast ratio which is the contrast ratio between the planned area image 3 ("12+1=13") in the planned pasting area 4 and the print sheet 2 as the background in the picked-up image (=luminance of the planned area image 3/luminance of the print sheet 2), and also detects a reference contrast ratio which is the contrast ratio between the reference mark 7 printed on the reference label 8 and the tape 9 (=luminance of the reference mark 7/luminance of the tape 9).

For example, it is now assumed that the planned area contrast ratio is "0.2" and the reference contrast ratio is "0.1". In this case, the terminal-side control unit 209 creates image data of the print image 5 in such a way that the contrast ratio between the print image 5 on the fixed-length label 6 and the tape 9 (luminance of the print image 5/luminance of the tape 9) coincides with the planned area contrast ratio "0.2", that is, so that the luminance of the print image 5 becomes lower than the luminance of the reference mark 7 (so that the print image 5 is printed as lighter). More specifically, if the print image 5 on the fixed-length label 6 is printed normally, the luminance of the print image 5 is similar to the luminance of the reference mark 7. Therefore, image data is created by thinning dots to be printed in the print image 5 on the fixed-length label 6. Thus, the fixed-length label 6 with the same contrast ratio as the planned area contrast ratio can be created. Even after the created fixed-length label 6 is pasted in the planned pasting area 4 on the print sheet 2, the print sheet can have an overall appearance that does not look awkward.

Moreover, in the embodiment, the tape printer 100 creates the reference label 8 and creates the fixed-length label 6, and the portable terminal 200 carries out other operations. However, the allocation of each operation in the label creation processing is not limited to this example. For example, the tape printer 100 with an image pickup function may pick up an image of the reference label 8 and the planned pasting area 4. Moreover, a single device may carry out all the operations in the label creation processing.

Also, while the case where the fixed-length label 6 is created in order to correct a misprint is described in the embodiment, the application is not limited to this example, as a matter of course. Moreover, the tape printer 100 may carry out blank printing, thus creating the fixed-length label 6 having nothing printed on the tape 9.

Next, a second embodiment of the label creation system 1 of the invention will be described. The label creation system 1 according to this embodiment detects the tape with of the tape 9 as a print target, and also creates plural fixed-length labels 6 on which the print image 5 is divided into plural images and thus printed if the tape width of the tape 9 is smaller than the planned pasting area width dimension 'b'. In this embodiment, similar configuration parts to the first embodiment will not be described further in detail. A modification applied to similar configuration parts to the first embodiment is similarly applied to this embodiment.

Figure 9:
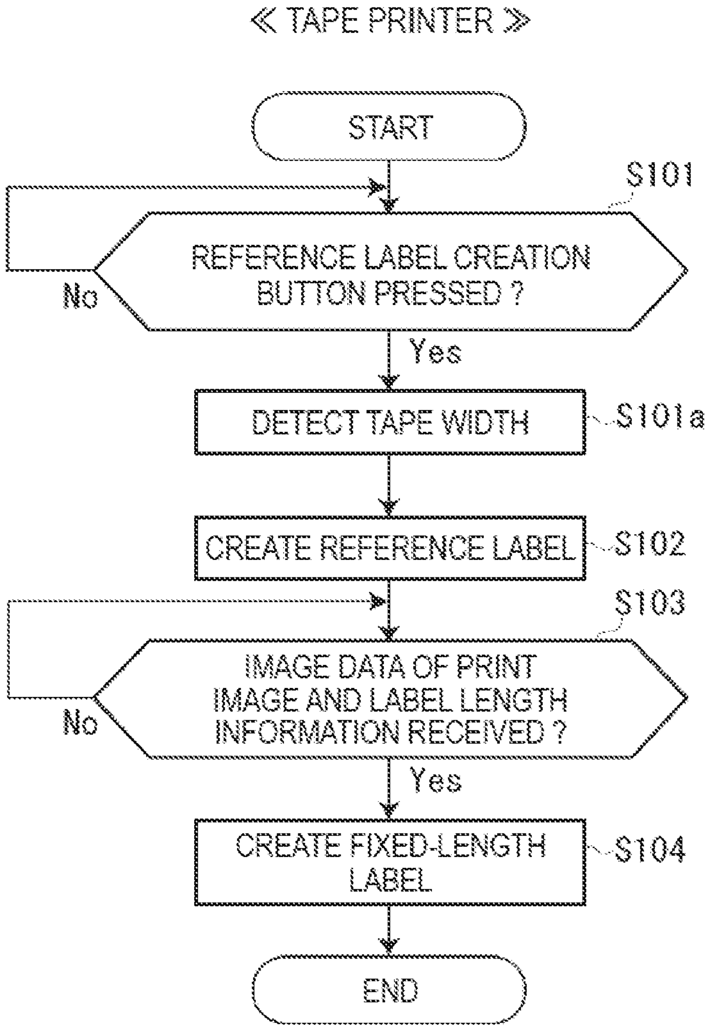
FIG. 9 is a flowchart showing the operation of a tape printer in a label creation system according to a second embodiment of the invention.
Figure 10:
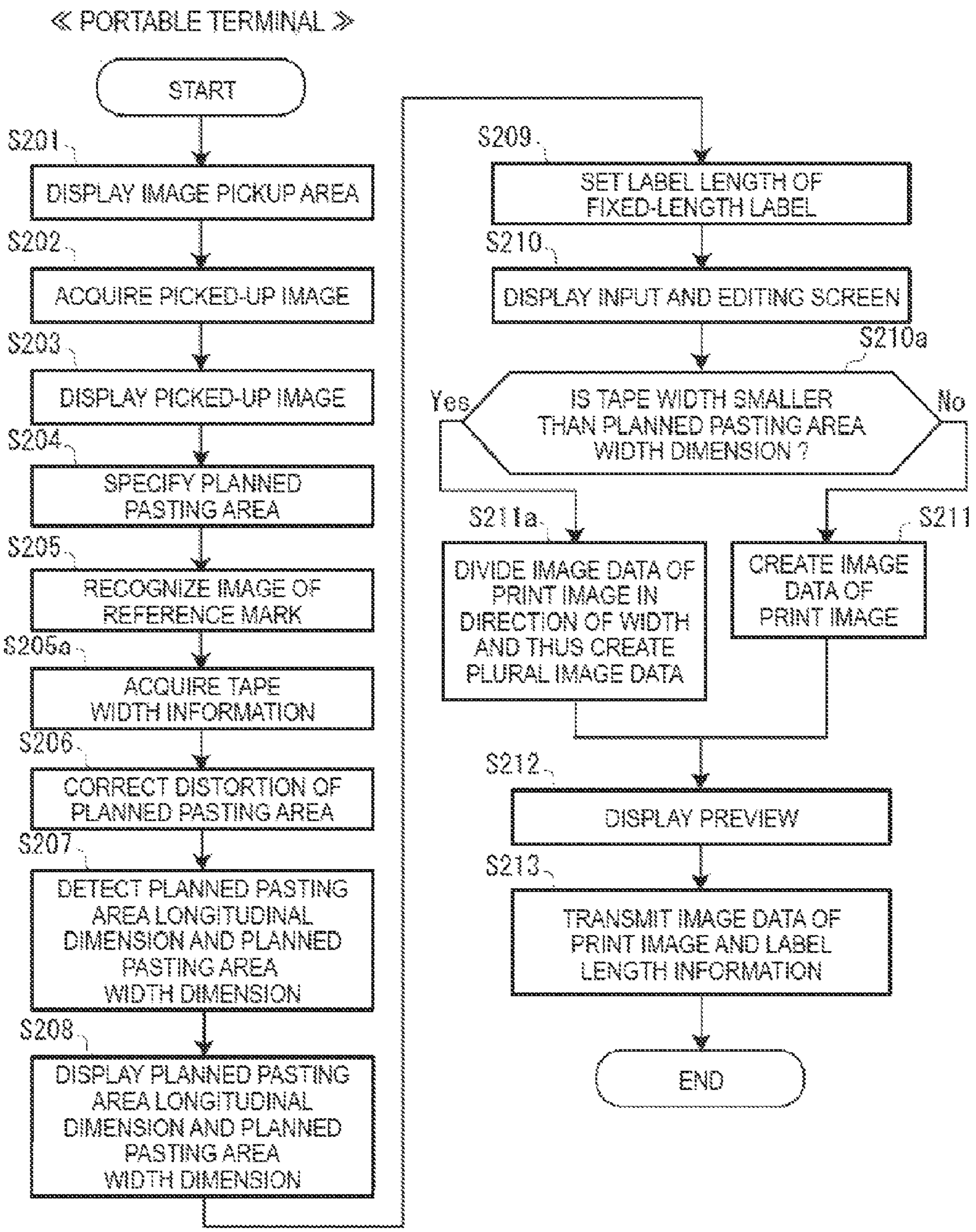
FIG. 10 is a flowchart showing the operation of a portable terminal in the label creation system according to the second embodiment of the invention.
Figure 11:
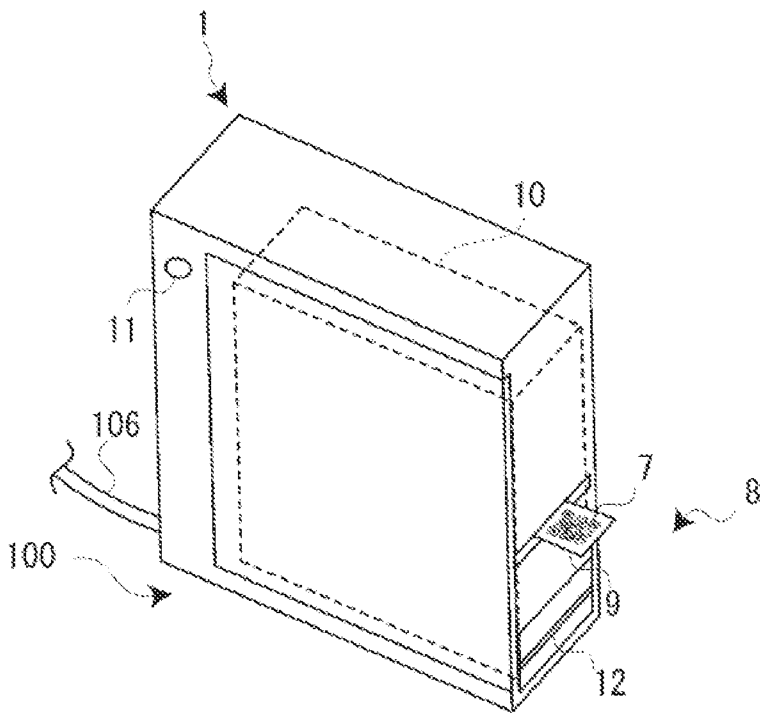
FIG. 11 shows a reference label including tape width information.

A series of operations in the label creation processing in the label creation system 1 will be described with reference to FIGS. 9 and 10. First, in the tape printer 100, if the reference label creation button 11 is pressed by the user (S101), the tape width detection unit 102 detects the tape width (for example, 12 mm) of the tape 9 as a print target (S101*a*). The apparatus-side control unit 105 creates image data of the reference mark 7 including detected tape width information (for example, QR code (trademark registered)), and the tape printing unit 101 prints the image data on the tape 9 and thus creates the reference label 8, as shown in FIG. 11 (S102). In this case, too, each side of the reference mark 7 is a unit length. As the reference mark 7 including the tape width information, another two-dimensional code formed by coding the tape width information may be used, or a rectangle containing the tape width "12 mm" by letters and numbers may be used.

Next, the portable terminal 200 executes the operations from the startup of the dedicated application to the specification of the planned pasting area 4 in the picked-up image (S204), as in the first embodiment. After that, when recognizing an image of the reference mark 7 (S205), the portable terminal 200 acquires the tape width from the tape width information included in the reference mark 7 in the picked-up image (S205*a*).

Figure 12:
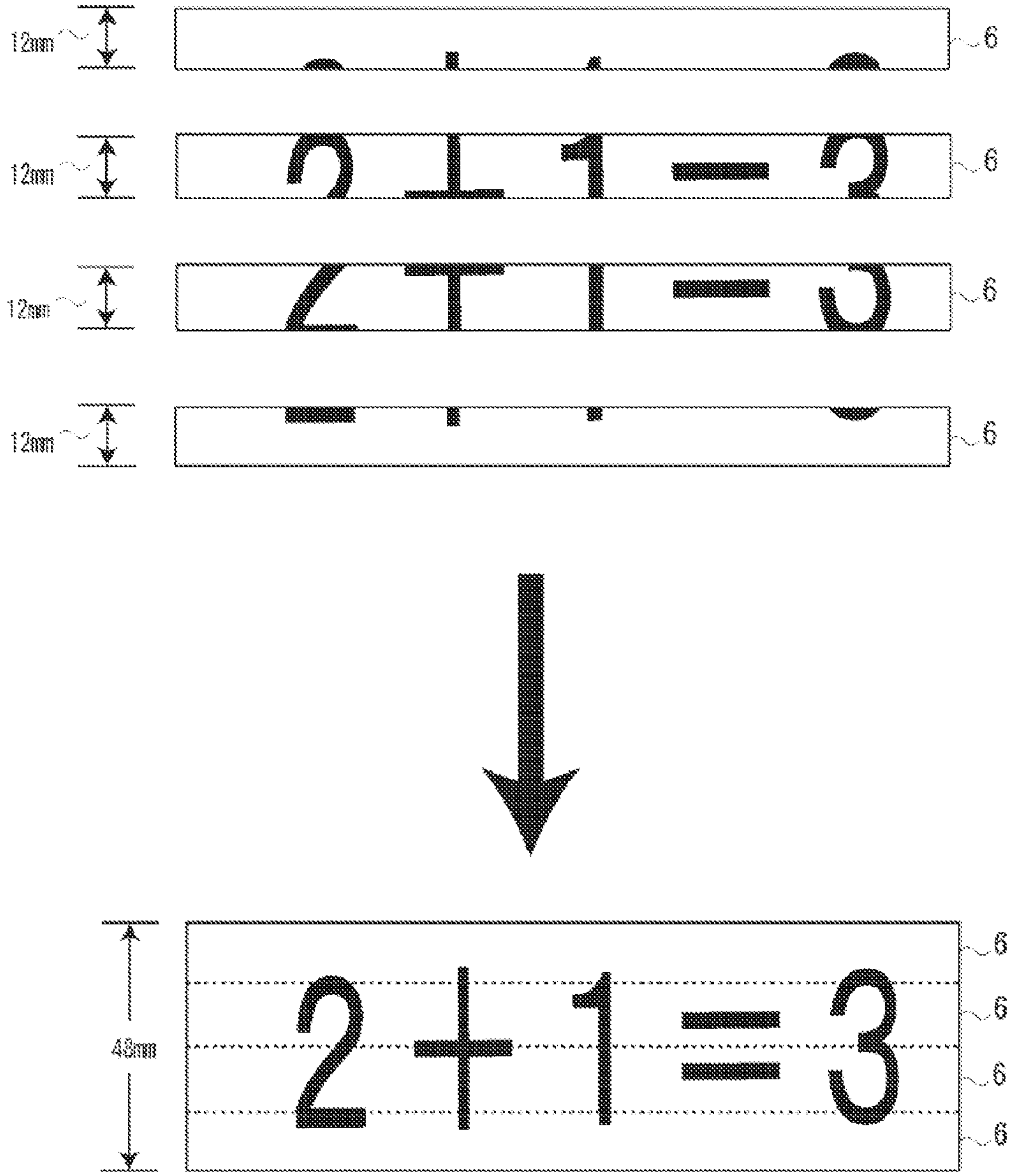
FIG. 12 shows a fixed-length label that is printed based on divided print image data.

Then, the portable terminal 200 executes the operations from the distortion correction of the planned pasting area 4 (S206) to the detection of the planned pasting area longitudinal dimension 'a' and the planned pasting area width dimension 'b' (for example, 48 mm) (S207), as in the first embodiment. After that, the terminal-side control unit 209 compares the acquired tape width (12 mm) and the detected planned pasting area width dimension 'b' (48 mm), and if the tape width is smaller than the planned pasting area width dimension 'b' (S210*a*; Yes), the terminal-side control unit 209 divides the image data of the print image 5 in the direction of width to create plural image data (in this case, into four image data) based on the tape width and the planned pasting area width dimension 'b' (S211*a*). In this case, the tape width of the fixed-length label 6 may be displayed on the preview screen on the portable terminal 200. Then, based on the label length of the fixed-length label 6 that is set and the divided image data of the print image 5, printing on the tape 9 is carried out to create plural (in this case, four) fixed-length labels 6, as shown in FIG. 12.

According to the above configuration, plural fixed-length labels 6 on which the print image 5 is divided in the direction of width into plural images and thus printed are created. Therefore, by pasting the plural fixed-length labels 6 lined up in the direction of width in the planned pasting area 4, the print image 5 suitable for the dimension of the planned pasting area 4 can be displayed in the planned pasting area 4.

In this embodiment, after the tape printer 100 prints the reference mark 7 including the tape width information on the tape 9 and thus creates the reference label 8, the portable terminal 200 acquires the tape width from the tape width information included in the reference label 8 in the picked-up image. However, the configuration for the portable terminal 200 to acquire the tape width information is not limited to this example. For example, the terminal-side control unit 209 of the portable terminal 200 may be configured to compare the reference mark 7 in the picked-up image and the tape 9 having the reference mark 7 printed thereon and thus detect the tape width, by image processing. Thus, even if the tape printer 100 does not have the tape width detection unit 102, the portable terminal 200 can acquire the tape width.

In this embodiment, the portable terminal 200 (smartphone) is described as an example of a print control apparatus. However, the print control apparatus is not limited to this example. For example, a mobile phone or another type of PDA (personal digital assistant), or a PC (personal computer) with a camera may also be employed.

Also, while the dedicated application is downloaded via the carrier network 218 in the embodiment, the dedicated application can also be stored in various storage media (for example, CD-ROM and flash memory) and provided in this form. Similarly, the control program to carry out the above label creation processing, stored in the ROM 110 of the tape printer 100, can also be stored in various storage media and provided in this form.

What is claimed is:

1. A label creation system comprising:

a tape printing unit which prints on a tape;

a reference mark which has an indicator of unit length;

an image pickup unit which picks up an image of the reference mark arranged along a pasting surface forming a planned pasting area where a fixed-length label having a predetermined label length is pasted, together with the planned pasting area;

an image processing unit having a dimension detection unit which, by image processing, compares the reference mark and the planned pasting area in a picked-up image and detects a length dimension of the planned pasting area that is in a direction of length of the fixed-length label; and a label length setting unit which sets a label length of the fixed-length label based on the length dimension of the planned pasting area that is detected;

wherein the tape printing unit prints on the tape and creates the fixed-length label, based on the label length of the fixed-length label that is set; and the image processing unit includes a distortion correction unit, which corrects distortion of the planned pasting area in the picked-up image by image processing, based on distortion of the reference mark in the picked-up image.

2. The label creation system according to claim 1, wherein the reference mark includes tape width information, the dimension detection unit further detects, based on the picked-up image, a width dimension of the planned pasting area that is in a direction of width of the fixed-length label, the label creation system further comprises:

a tape width acquisition unit which acquires the tape width from the tape width information included in the reference mark in the picked-up image; and a division image creation unit which, if the tape width that is acquired is smaller than the width dimension of the planned pasting area that is detected, divides image data of a print image on the fixed-length label to create plural data based on the tape width and the width dimension of the planned pasting area, and the tape printing unit prints on the tape to create the fixed-length label in plural number, based on the label length of the fixed-length label that is set and the image data of the print image that is divided.

3. A label creation system according to claim 1, wherein the dimension detection unit further detects, based on the picked-up image, a width dimension of the planned pasting area that is in a direction of width of the fixed-length label, the image processing unit further includes a memory which stores an original reference mark, a tape width detection unit compares the reference mark in the picked-up image and the original reference mark and detects a tape width of the tape, the label creation system further comprises:

a division image creation unit which, if the tape width that is detected is smaller than the width dimension of the planned pasting area that is detected, divides image data of a print image on the fixed-length label to create plural data based on the tape width and the width dimension of the planned pasting area, and the tape printing unit prints on the tape to create the fixed-length label in plural number, based on the label length of the fixed-length label that is set and the image data of the print image that is divided.

4. The label creation system according to claim 1, wherein, based on curved surface distortion of the reference mark in the picked-up image due to the pasting surface which is a curved surface, the distortion correction unit corrects the curved surface distortion of the planned pasting area in the picked-up image.

5. The label creation system according to claim 1, further comprising:

a contrast ratio detection unit which detects a planned area contrast ratio that is a contrast ratio between a planned area image printed in the planned pasting area as a part of a printed matter and a background in the picked-up image, and also detects a reference contrast ratio that is a contrast ratio between the reference mark and the tape; and a contrast adjustment unit which creates image data of a print image in such a way that a contrast ratio between the print image in the fixed-length label and the tape coincides with the planned area contrast ratio, based on a difference between the planned area contrast ratio and the reference contrast ratio.

6. The label creation system according to claim 1, wherein the tape printing unit prints the reference mark having the indicator of unit length onto the tape.

7. A print control apparatus which sends image data to a tape printer for printing a print image comprising:

an image pickup unit which picks up an image of a pasting surface forming a planned pasting area where a fixed-length label having a predetermined label length is pasted, together with a reference mark arranged along the planned pasting area as an indicator of unit length;

an image processing unit having a dimension detection unit which, by image processing, compares the reference mark and the planned pasting area in a picked-up image and detects a length dimension of the planned pasting area that is in a direction of length of the fixed-length label; and a label length setting unit which sets a label length of the fixed-length label based on the length dimension of the planned pasting area that is detected, wherein the image processing unit includes a distortion correction unit, which corrects distortion of the planned pasting area in the picked-up image by image processing based on distortion of the reference mark in the picked-up image.

8. The print control apparatus according to claim 7, wherein the reference mark includes tape width information of the tape, the dimension detection unit further detects, based on the picked-up image, a width dimension of the planned pasting area that is in a direction of width of the fixed-length label, the print control apparatus further comprises:

a tape width acquisition unit which acquires the tape width from the tape width information included in the reference mark in the picked-up image; and a division image creation unit which, if the tape width that is acquired is smaller than the width dimension of the planned pasting area that is detected, divides image data of a print image on the fixed-length label to create plural data based on the tape width and the width dimension of the planned pasting area.

9. A print control apparatus according to claim 7, wherein the dimension detection unit further detects, based on the picked-up image, a width dimension of the planned pasting area that is in a direction of width of the fixed-length label, the image processing unit further includes a memory which stores an original reference mark, a tape width detection unit compares the reference mark in the picked-up image and the original reference mark and detects a tape width of the tape, the print control apparatus further comprises a division image creation unit which, if the tape width that is detected is smaller than the width dimension of the planned pasting area that is detected, divides image data of a print image on the fixed-length label to create plural data based on the tape width and the width dimension of the planned pasting area.

10. The print control apparatus according to claim 7, wherein, based on curved surface distortion of the reference mark in the picked-up image due to the pasting surface which is a curved surface, the distortion correction unit corrects the curved surface distortion of the planned pasting area in the picked-up image.

11. The print control apparatus according to claim 7, further comprising:

a contrast ratio detection unit which detects a planned area contrast ratio that is a contrast ratio between a planned area image printed in the planned pasting area as a part of a printed matter and a background in the picked-up image, and also detects a reference contrast ratio that is a contrast ratio between the reference mark and the tape; and a contrast adjustment unit which creates image data of a print image in such a way that a contrast ratio between the print image in the fixed-length label and the tape coincides with the planned area contrast ratio, based on a difference between the planned area contrast ratio and the reference contrast ratio.

12. A print control method comprising:

acquiring a picked-up image from an image pickup unit which picks up an image of a pasting surface forming a planned pasting area where a fixed-length label having a predetermined label length is pasted, together with a reference mark arranged along the planned pasting area as an indicator of unit length;

correcting distortion of the planned pasting area in the picked-up image by image processing based on distortion of the reference mark in the picked-up image;

comparing the reference mark and the planned pasting area in the picked-up image and detecting a length dimension of the planned pasting area that is in a direction of length of the fixed-length label by image processing; and setting a label length of the fixed-length label based on the length dimension of the planned pasting area that is detected.

13. A non-transitory computer readable medium storing a computer program product causing a computer to execute each process of the print control method according to claim 12.

* * * * *